US008656192B2

(12) United States Patent
Lee

(10) Patent No.: US 8,656,192 B2
(45) Date of Patent: Feb. 18, 2014

(54) APPARATUS AND METHOD FOR MANAGING POWER IN POWER OF ETHERNET SYSTEM

(75) Inventor: Kyong-Yeol Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 564 days.

(21) Appl. No.: 12/698,595

(22) Filed: Feb. 2, 2010

(65) Prior Publication Data

US 2010/0199113 A1 Aug. 5, 2010

(30) Foreign Application Priority Data

Feb. 2, 2009 (KR) .................. 10-2009-0007900

(51) Int. Cl.
G06F 1/26 (2006.01)
G06F 7/04 (2006.01)

(52) U.S. Cl.
USPC .............................. 713/300; 726/2

(58) Field of Classification Search
None
See application file for complete search history.

(56) References Cited

U.S. PATENT DOCUMENTS

| 7,472,290 | B2* | 12/2008 | Diab et al. ............... 713/300 |
| 7,549,067 | B2* | 6/2009 | Tolliver .................. 713/320 |
| 2007/0110360 | A1* | 5/2007 | Stanford ................. 385/14 |
| 2008/0005601 | A1* | 1/2008 | Diab ...................... 713/300 |
| 2008/0052546 | A1* | 2/2008 | Schindler et al. ........ 713/300 |
| 2008/0244282 | A1* | 10/2008 | Hansalia et al. ......... 713/300 |
| 2008/0256598 | A1* | 10/2008 | Diab ...................... 726/2 |

* cited by examiner

Primary Examiner — Ji H Bae
(74) Attorney, Agent, or Firm — Jefferson IP Law, LLP

(57) ABSTRACT

An apparatus and method for supplying power in a PoE system are provided. The amount of power required by a device is determined when the device connects to an interface. Power is temporarily supplied to the device if the required power supply is available to the device. It is determined whether to authenticate the device. Power is continuously supplied to the device if the device is authenticated.

19 Claims, 4 Drawing Sheets

APPARATUS AND METHOD FOR MANAGING POWER IN POWER OF ETHERNET SYSTEM

PRIORITY

This application claims the benefit under 35 U.S.C. §119(a) to a Korean patent application filed in the Korean Intellectual Property Office on Feb. 2, 2009 and assigned Serial No. 10-2009-0007900, the entire disclosure of which is hereby incorporated by reference.

BACKGROUND OF THE INVENTION

1. Field of the Invention

Aspects of the present invention relate to an apparatus and method for managing power supply in a Power over Ethernet (PoE) system. More particularly, aspects of the present invention relate to an apparatus and method for reducing power consumption in a PoE system.

2. Description of the Related Art

A PoE system uses a PoE control unit to supply power to devices connected to an Ethernet interface. For example, a conventional PoE system generally supplies power according to a process illustrated in FIG. 1.

FIG. 1 is a flowchart illustrating a conventional process for supplying power in the PoE system. Referring to FIG. 1, a device connects to an Ethernet interface in step 101. In step 103, the PoE system determines whether power supply is available to the device. If power supply is available to the device, the PoE system supplies power to the device in step 109. On the other hand, if power supply is not available to the device, the PoE system determines the PoE priority of the device in step 105.

In step 107, the PoE system determines whether another device has a lower PoE priority. If there is a device that has a lower PoE priority, then in step 113 the PoE system withdraws the power supply to the device with the lower PoE priority. Thereafter, the PoE system returns to step 103 to again determine whether power supply is available to the device.

On the other hand, if no other device has a lower PoE priority, then in step 111 the PoE system restricts the power supply to the device. Thereafter, the PoE system ends the power supply process.

As described above, the conventional PoE system determines whether to supply power and maintain power supply based on the total power resources and the PoE priority information of the interface. Accordingly, the conventional PoE system may supply power even to an unauthenticated device, thus causing unnecessary power consumption.

The PoE control unit periodically senses devices to detect whether there is a device connected to the interface. The PoE control unit also continues to measure the power consumption of a device connected to the interface, and calculates the total power consumption of the interface to manage the total power resources. If the PoE system supplies power even to an unauthenticated device, the PoE control unit monitors the power consumption of even the unauthenticated device, thus unnecessarily increasing the load of the PoE control unit.

SUMMARY OF THE INVENTION

Aspects of the present invention address at least the above-mentioned problems and/or disadvantages and provide at least the advantages described below. Accordingly, an aspect of the present invention is to provide an apparatus and method for reducing unnecessary power consumption in a PoE system.

Another aspect of the present invention is to provide an apparatus and method for reducing the load of a PoE control unit according to power supply in a PoE system.

Yet another aspect of the present invention is to provide an apparatus and method for reducing the load of a PoE control unit according to the monitoring of power consumption of devices in a PoE system.

Still another aspect of the present invention is to provide an apparatus and method for controlling power supply according to authentication information of devices connected to an interface in a PoE system.

In accordance with an aspect of the present invention, a method for supplying power in a PoE system is provided. The method includes: determining an amount of power required by a first device when the first device connects to an interface, supplying power to the first device temporarily if the required power supply is not available to the first device, determining whether to authenticate the first device, and supplying power to the first device continuously when the first device is authenticated.

In accordance with another aspect of the present invention, an apparatus for supplying power in a PoE system is provided. The apparatus includes: a power source unit for supplying power to at least one device connected to an interface, a PoE control unit temporarily supplying power to a first device connecting to the interface, if power supply is available to the first device, and for continuously supplying power to the first device if the first device is authenticated, and a control unit for determining whether to authenticate the first device with the temporary power supply.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a scheme for reducing unnecessary power consumption in a PoE system. In order to reduce unnecessary power consumption, the PoE system supplies power only to authenticated devices connected to an Ethernet interface. To this end, the PoE system may be configured as illustrated in FIG. 2.

Figure 1:
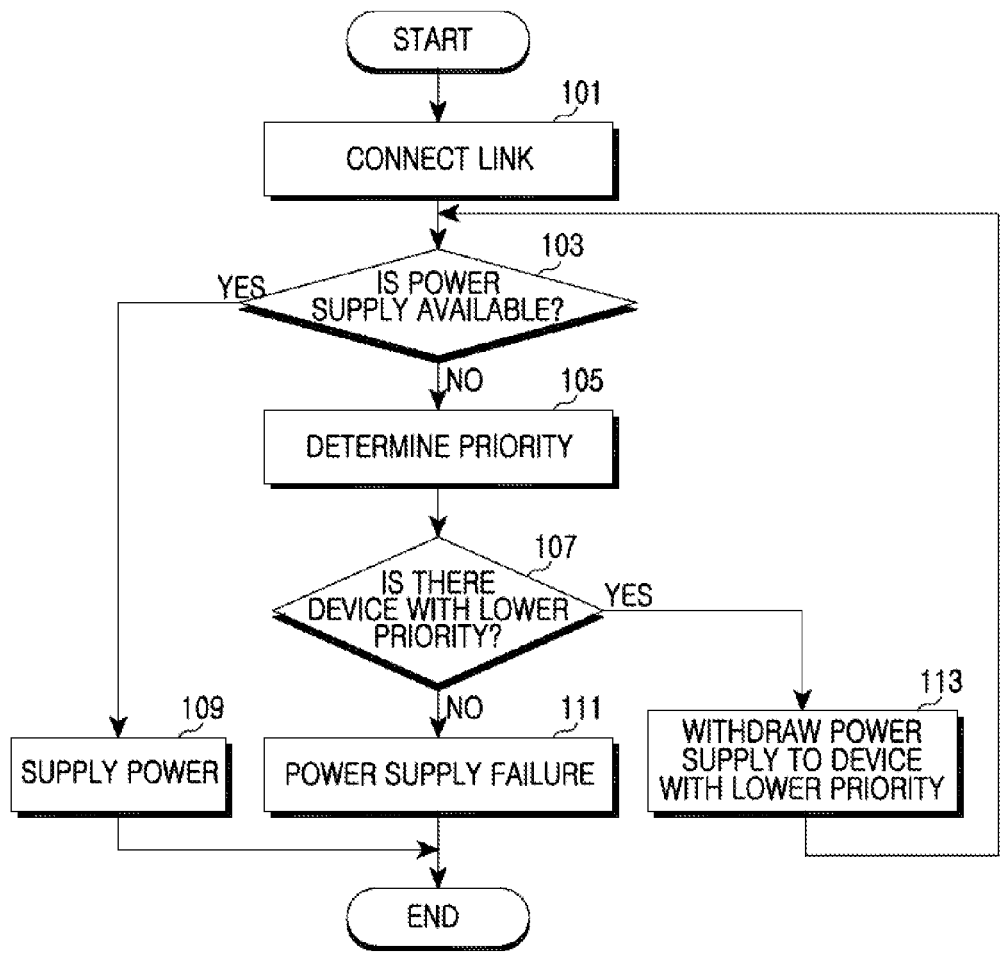
FIG. 1 is a flowchart illustrating a conventional process for supplying power in a PoE system.
Figure 2:
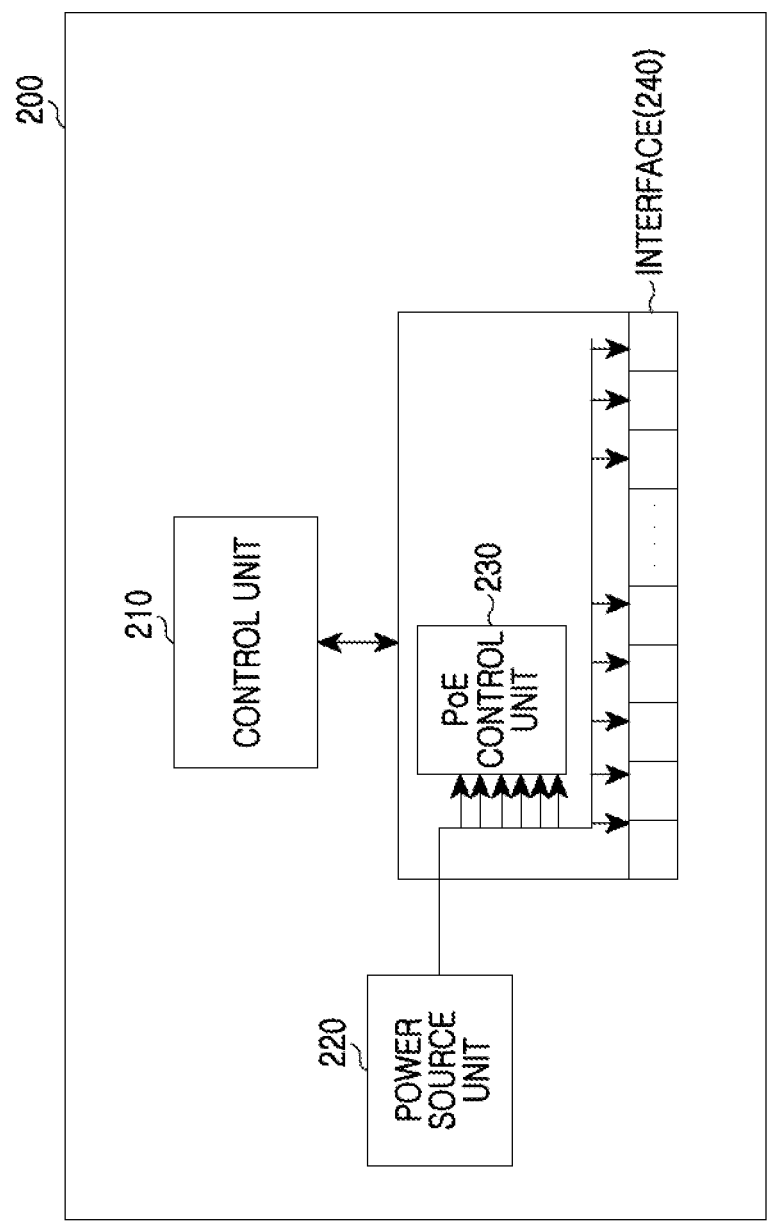
FIG. 2 is a block diagram of a PoE system according to an exemplary embodiment of the present invention.

FIG. 2 is a block diagram of a PoE system 200 according to an exemplary embodiment of the present invention. The PoE system 200 includes a control unit 210, a power source unit 220, a PoE control unit 230, and an interface 240. The PoE system may also include additional units. Similarly, the functionality of two or more of the above units may be integrated into a single component.

The control unit 210 controls an overall operation of the PoE system 200. When the PoE control unit 230 temporarily supplies power to a device that newly connects to the interface 240, the control unit 210 determines whether to authenticate the newly connected device. For example, the control unit 210 uses a protocol, such as 802.1x or LLDP and LLDP-MED, to determine whether to authenticate the newly connected device. If using the 802.1x protocol, the control unit 210 uses 802.1x port-based authentication information to determine whether to authenticate the newly connected device. If using the LLDP and LLDP-MED protocol, the control unit 210 uses a field value (e.g., VLAN ID or DSCP) or a task group of the newly connected device to determine whether to authenticate the newly connected device. These protocols should be understood as merely exemplary; other protocols may also be used to authenticate the newly connected device.

The power source unit 220 supplies power to be provided to devices that connect to the interface 240.

The PoE control unit 230 temporarily supplies power to the newly connected device. Thereafter, according to the authentication information of the newly connected device received from the control unit 210, the PoE control unit 230 determines whether to maintain the power supply to the device. For example, the PoE control unit 230 may be configured as illustrated in FIG. 3.

The interface 240 connects an Ethernet link with devices that desire connection. The interface 240 may include at least one port connected to each device.

Figure 3:
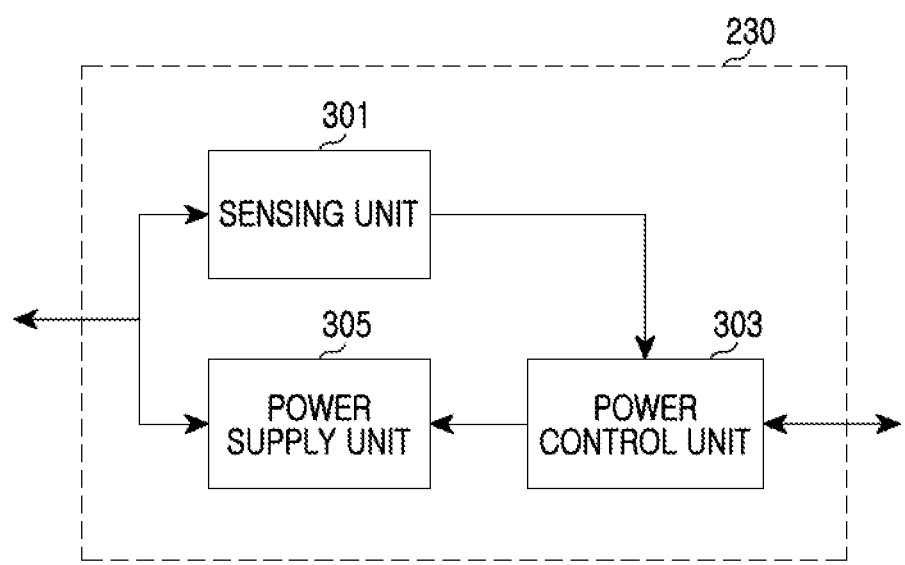
FIG. 3 is a block diagram of a PoE control unit of the PoE system according to an exemplary embodiment of the present invention.

FIG. 3 is a block diagram of the PoE control unit 230 of the PoE system 200 according to an exemplary embodiment of the present invention. Referring to FIG. 3, the PoE control unit 230 includes a sensing unit 301, a power control unit 303, and a power supply unit 305.

The sensing unit 301 determines whether a device has newly connected to the interface 240. The sensing unit 301 performs a periodic sensing operation to determine whether a device has newly connected to the interface 240.

The power control unit 303 controls the power supply to devices connected to the interface 240. For example, if the sensing unit 301 determines that a device is newly connected to the interface 240, the power control unit 303 determines whether to supply power to the newly connected device temporarily, according to the amount of power required by the newly connected device. If power supply is available to the newly connected device, the power control unit 303 performs a control operation to temporarily supply power to the newly connected device. On the other hand, if power supply is not available to the newly connected device, the power control unit 303 performs a control operation to temporarily supply power to the newly connected device by withdrawing the power supply to a device having a lower PoE priority than the newly connected device. If no other device has a lower PoE priority, then the power control unit 303 restricts the power supply to the newly connected device.

In addition, according to the authentication information received from the control unit 210 of the PoE system 200, the power control unit 303 determines whether to maintain the power supply to the newly connected device. For example, if the newly connected device with the temporary power supply is successfully authenticated, the power control unit 303 maintains the power supply to the newly connected device. On the other hand, if the newly connected device with the temporary power supply is not authenticated, the power control unit 303 performs a control operation to withdraw the power supply to the device. The power control unit 303 performs a control operation to interrupt the power supply to the newly connected device. Herein, the power control unit 303 performs a control operation to interrupt the power supply to the newly connected device until the newly connected device connects an Ethernet link again.

Under the control of the power control unit 303, the power supply unit 305 supplies power to a device connected to the interface 240.

In the above embodiment, the PoE control unit 230 of the PoE system 200 controls the power supply and maintenance according to the authentication information of the device received from the control unit 210. In another exemplary embodiment, the control unit 210 of the PoE system 200 may control the power supply and maintenance according to the authentication information of the device.

Figure 4:
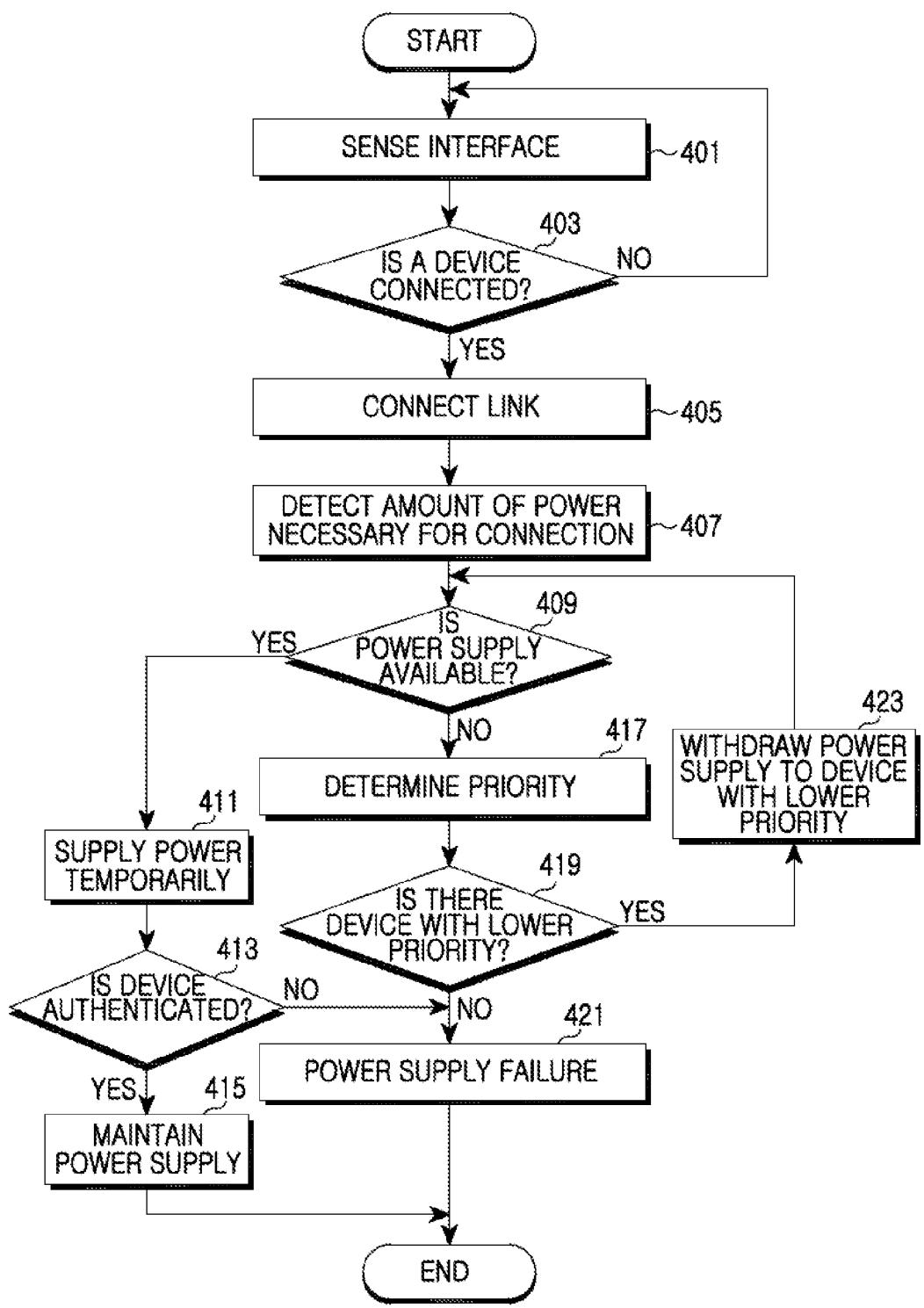
FIG. 4 is a flowchart illustrating a process for supplying power in a PoE system according to an exemplary embodiment of the present invention.

In order to reduce unnecessary power consumption, the PoE system supplies power only to an authenticated device connected to the Ethernet interface, as illustrated in FIG. 4.

FIG. 4 is a flowchart illustrating a process for supplying power in the PoE system according to an exemplary embodiment of the present invention. Referring to FIG. 4, in step 401, the PoE system determines whether a device has newly connected to the interface. For example, the PoE system performs a periodic sensing operation to determine the presence of a newly connected device. In step 403, the PoE system determines whether, as a result of the sensing operation, a device has newly connected to the interface.

If there is no newly connected device, the PoE system returns to step 401 to again determine whether there is a newly connected device. For example, the PoE system performs a periodic sensing operation to determine the presence of a newly connected device. If there is a newly connected device, the PoE system connects an Ethernet link with the newly connected device in step 405.

In step 407, the PoE system determines the amount of power required by the newly connected device. For example, when connecting to the interface, the newly connected device transmits the amount of power necessary for connection to the interface to the PoE system through the Ethernet link. Accordingly, the PoE system can determine the amount of power required by the newly connected device.

In step 409, the PoE system determines whether the required power supply is available to the newly connected device. If the required power supply is available to the newly connected device, the PoE system temporarily supplies power to the device in step 411.

In step 413, the PoE system acquires information about the newly connected device with the temporary power supply to determine whether to authenticate the newly connected device. For example, the PoE system uses a protocol, such as 802.1x or LLDP and LLDP-MED, to acquire information about the newly connected device. Thereafter, the PoE system uses the information about the device to determine whether to authenticate the newly connected device. If the newly connected device is authenticated, the PoE system maintains the power supply to the newly connected device in step 415.

On the other hand, if the newly connected device is not authenticated, the PoE system withdraws (or interrupts) the power supply to the device in step 421. The PoE system interrupts the power supply to the newly connected device until the newly connected device connects an Ethernet link again.

If the required power supply is not available to the newly connected device, the PoE system determines the PoE priority of the devices connected to the interface in step 417. In step 419, the PoE system determines whether there is a device having a lower PoE priority than the newly connected device.

If there is a device that has a lower PoE priority than the newly connected device, the PoE system withdraws the power supply to a device having a lower PoE priority than the newly connected device in step 423. For example, the PoE system may withdraw the power supply to the device that has the lowest PoE priority. Thereafter, the PoE system returns to step 409 to again determine whether the required power supply is available to the newly connected device.

On the other hand, if no device has a lower PoE priority than the newly connected device, the PoE system determines a failure in power supply to the newly connected device in step 421. Accordingly, the PoE system restricts the power supply to the newly connected device. Thereafter, the PoE system ends the power supply process.

As described above, exemplary embodiments of the present invention supply power and maintain power supply only to authenticated devices in the PoE system, thereby making it possible to reduce unnecessary power resource consumption and reduce the load of the PoE control unit that monitors the power consumption of devices supplied with power.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for supplying power in a Power over Ethernet (PoE) system, the method comprising:
    determining an amount of power required by a first device when the first device connects to an interface;
    supplying power to the first device temporarily if the required power supply is available to the first device;
    determining the PoE priority of the first device and at least one other device connected to the interface if the required power supply is not available to the first device;
    withdrawing a power supply to a second device with a lower PoE priority than the first device if the required power supply is not available to the first device;
    determining whether the required power supply is available to the first device, after withdrawing the power supply to the second device;
    determining whether to authenticate the first device; and
    supplying power to the device continuously if the device is authenticated,
    wherein if the required power supply is not available to the first device, iteratively identifying one other device with a lower PoE than the first device, withdrawing a power supply to the identified one other device with a lower PoE priority than the first device, and thereafter determining whether the required power supply is available to the first device, until the required power supply is available to the first device.

2. The method of claim 1, further comprising:
    performing a periodic sensing operation to detect whether the first device is connected to the interface.

3. The method of claim 1, wherein the interface includes an Ethernet interface.

4. The method of claim 1, wherein the determining of whether to authenticate the first device comprises using an 802.1x protocol to determine whether to authenticate the first device.

5. The method of claim 1, wherein determining of whether to authenticate the first device comprises using an LLDP protocol and an LLDP-MED protocol to determine whether to authenticate the device.

6. The method of claim 1, further comprising:
    withdrawing the temporary power supply to the first device if the device is not authenticated.

7. The method of claim 1, wherein the withdrawing of the power supply to the second device comprises withdrawing the power supply to a device with the lowest PoE priority if two or more devices have a lower PoE priority than the first device.

8. The method of claim 1, further comprising:
    restricting the power supply to the first device connected to the interface if no other device has a lower PoE priority than the first device.

9. An apparatus for supplying power in a PoE system, the apparatus comprising:
    a power source unit for supplying power to at least one device connected to an interface;
    a PoE control unit for temporarily supplying power to a first device connecting to the interface if power supply is available to the first device, and for continuously supplying power to the first device if the first device is authenticated;
    a control unit for determining whether to authenticate the first device with the temporary power supply; and
    a power control unit for performing a control operation to temporarily supply power to the first device if power supply is available to the first device, wherein if power supply is not available to the first device and there is a second device connected to the interface with a lower PoE priority than the first device, the power control unit performs a control operation to withdraw the power supply to the second device with the lower PoE priority, wherein the power control unit determines whether there is power supply available to the first device after the power supply to the second device has been withdrawn, and wherein the power control unit is configured to, if the required power supply is not available to the first device, iteratively identify one other device with a lower PoE than the first device, withdraw a power supply to the identified one other device with a lower PoE priority than the first device, and thereafter determine whether the required power supply is available to the first device, until the required power supply is available to the first device.

10. The apparatus of claim 9, wherein the interface includes an Ethernet interface.

11. The apparatus of claim 9, wherein the PoE control unit comprises:
 a sensing unit for performing a periodic sensing operation to determine whether the first device is connected to the interface; and
 a power supply unit for supplying power, under the control of the power control unit, to at least one device connected to the interface,
 wherein the power control unit is further configured for performing a control operation to continuously supply power to the first device if the first device is authenticated.

12. The apparatus of claim 11, wherein if two or more devices have a lower PoE priority than the first device, the power control unit performs a control operation to withdraw the power supply to the device with the lowest PoE priority.

13. The apparatus of claim 11, wherein if no device has a lower PoE priority than the first device, the power control unit performs a control operation to restrict the power supply to the first device.

14. The apparatus of claim 11, wherein if the first device is not authenticated, the power control unit performs a control operation to withdraw the temporary power supply to the first device.

15. The apparatus of claim 9, wherein the control unit uses an 802.1x protocol to determine whether to authenticate the first device with the temporary power supply.

16. The apparatus of claim 9, wherein the control unit uses an LLDP protocol and an LLDP-MED protocol to determine whether to authenticate the first device with the temporary power supply.

17. A method of supplying power in a Power over Ethernet (PoE) system, the method comprising:
 detecting a first device if the first device connects to an interface;
 determining whether power can be supplied to the first device;
 if power can be supplied to the first device, temporarily supplying power to the first device while the first device is authenticated, and then continuously supplying power to the first device after the first device is authenticated;
 if power cannot be supplied to all devices in the PoE system and the system includes a second device having a lower priority than the first device, interrupting a power supply to the second device and determining that power can be supplied to the first device; and
 if power cannot be supplied to the first device or the first device is not authenticated, interrupting any power supply to the first device,
 wherein if a required power supply is not available to the first device, iteratively identifying one other device with a lower PoE than the first device, interrupting a power supply to the identified one other device with a lower PoE priority than the first device, and thereafter determining whether the required power supply is available to the first device, until the required power supply is available to the first device.

18. The method of claim 17, wherein the determining of whether power can be supplied to the first device comprises:
 if power cannot be supplied to all devices in the PoE system and the system does not include a second device having a lower priority than the first device, determining that power cannot be supplied to the first device.

19. The method of claim 18, wherein the second device is the device in the system that has the lowest priority.

* * * * *